United States Patent
Liu et al.

(10) Patent No.: US 10,947,680 B2
(45) Date of Patent: Mar. 16, 2021

(54) LIFTER ASSEMBLY AND SYSTEM FOR REMOVING HIGHWAY OR RAILWAY BRIDGES

(71) Applicants: Yabin Liu, Beijing (CN); Da Pan, Beijing (CN); Wei Chen, Beijing (CN)

(72) Inventors: Yabin Liu, Beijing (CN); Da Pan, Beijing (CN); Wei Chen, Beijing (CN)

( * ) Notice: Subject to any disclaimer, the term of this patent is extended or adjusted under 35 U.S.C. 154(b) by 170 days.

(21) Appl. No.: 16/138,899

(22) Filed: Sep. 21, 2018

(65) Prior Publication Data

US 2019/0085516 A1    Mar. 21, 2019

Related U.S. Application Data

(60) Provisional application No. 62/561,411, filed on Sep. 21, 2017.

(51) Int. Cl.
| | |
|---|---|
| *E01D 21/00* | (2006.01) |
| *B66C 23/36* | (2006.01) |
| *B60F 1/04* | (2006.01) |
| *B66C 23/50* | (2006.01) |
| *B66C 23/78* | (2006.01) |
| *B66C 9/00* | (2006.01) |

(52) U.S. Cl.
CPC .............. *E01D 21/00* (2013.01); *B60F 1/043* (2013.01); *B66C 9/00* (2013.01); *B66C 23/36* (2013.01); *B66C 23/365* (2013.01); *B66C 23/50* (2013.01); *B66C 23/78* (2013.01); *B66C 2700/035* (2013.01); *B66C 2700/0342* (2013.01); *B66C 2700/0371* (2013.01); *B66C 2700/0378* (2013.01)

(58) Field of Classification Search
CPC ....... B66C 23/36; B66C 23/365; B66C 23/46; B66C 23/50; B66C 25/00; E01D 21/00; E01D 21/06; E01D 21/065; B60F 1/04; B60F 1/043
USPC .................................................... 14/77.1, 78
See application file for complete search history.

(56) References Cited

U.S. PATENT DOCUMENTS

| | | | | |
|---|---|---|---|---|
| 751,205 | A * | 2/1904 | Raymond ............... | B63B 23/18 114/374 |
| 2,283,049 | A * | 5/1942 | Cormier, Jr. .......... | E04H 12/187 52/117 |
| 2,671,414 | A * | 3/1954 | Moe ........................ | E01B 29/16 104/5 |

(Continued)

*Primary Examiner* — Michael R Mansen
*Assistant Examiner* — Juan J Campos, Jr.
(74) *Attorney, Agent, or Firm* — Nan Jiang; Dickinson Wright PLLC (57) ABSTRACT

A lifter assembly includes a base having a top and a bottom surface. Connectors are attached to the base extending outwardly from the bottom surface. Each of the connectors includes at least one rail wheel rotatably attached thereto. The base includes traveling wheels rotatably attached thereto. A post is attached to the base extending outwardly from the top surface to a distal end. An arm is disposed on the distal end, rotatably attached to the post, extending outwardly to a terminal end. A support is movably attached to the arm and extends outwardly to a support end. A trolley is slidably disposed on the arm and movable along the arm between the terminal end and the post. Each of the traveling wheels includes a leg pivotably attached to the base connecting the traveling wheel to the base and move the traveling wheel between a transport and a storage position.

20 Claims, 10 Drawing Sheets

(56) References Cited

U.S. PATENT DOCUMENTS

| | | | | |
|---|---|---|---|---|
| 3,140,857 | A * | 7/1964 | Nickles | B66C 23/36 254/281 |
| 3,263,628 | A * | 8/1966 | Grove | B60F 1/043 105/72.2 |
| 3,269,331 | A * | 8/1966 | Thompson | B60F 1/043 105/72.2 |
| 3,344,747 | A * | 10/1967 | Keller | B60F 1/043 105/72.2 |
| 3,460,691 | A * | 8/1969 | Wieger | E02F 3/303 414/718 |
| 3,892,187 | A * | 7/1975 | White, Jr. | B60F 1/043 105/75 |
| 4,096,954 | A * | 6/1978 | Buckner | B66C 23/50 104/137 |
| 4,938,643 | A * | 7/1990 | Lamb | B61D 3/182 104/44 |
| 5,016,544 | A * | 5/1991 | Woollam | B61D 15/02 105/215.2 |
| 5,103,740 | A * | 4/1992 | Masse | B60F 1/043 105/72.2 |
| 5,119,723 | A * | 6/1992 | Lovitt, Jr. | E01B 29/10 104/7.1 |
| 5,649,490 | A * | 7/1997 | Lovitt | B60F 1/005 104/7.1 |
| 5,836,463 | A * | 11/1998 | Khachaturian | B66C 19/02 212/270 |
| 6,601,717 | B1 * | 8/2003 | Khachaturian | B66C 19/02 212/270 |
| 7,066,343 | B1 * | 6/2006 | Khachaturian | B66C 5/02 212/270 |
| 7,789,253 | B2 * | 9/2010 | Sawai | B66C 23/36 212/301 |
| 8,166,883 | B1 * | 5/2012 | Coots | E01B 29/32 104/16 |
| 8,316,774 | B1 * | 11/2012 | Coots | B61C 11/00 105/72.2 |
| 9,802,796 | B2 * | 10/2017 | Li | B66C 23/62 |
| 2003/0172837 | A1 * | 9/2003 | Whiston | B61D 15/00 105/215.2 |
| 2014/0300112 | A1 * | 10/2014 | Lee | B66C 1/108 290/55 |

* cited by examiner

LIFTER ASSEMBLY AND SYSTEM FOR REMOVING HIGHWAY OR RAILWAY BRIDGES

CROSS REFERENCE TO RELATED APPLICATION

This application claims the benefit of U.S. Provisional Patent Application Ser. No. 62/561,411 filed on Sep. 21, 2017, the entire disclosure of which is incorporated herein by reference in its entirety.

BACKGROUND OF THE INVENTION

1. Field of the Invention

The present invention generally relates to a lifter assembly and a system for removing or replacing highway or railway bridges.

2. Description of the Prior Art

Some steel bridges used in railway have been in use for nearly a century. Inevitably, some of the steel bridges shown signs of aging or corrosion. In order to guarantee safety use of the steel bridges, the bridges showing serious damages or corrosions need to be replaced or removed. As time goes by, the workload of replacing or removing bridges becomes greater and machines have been used to provide an efficient way of removing the bridges.

One such a machine is disclosed in U.S. Pat. No. 7,470,586. The machine includes a base having a top surface for receiving a bridge span and a bottom surface disposed opposite of the top surface. A pair of connectors is attached to the base, spaced from one another, extending outwardly from the bottom surface of the base. Each of the connectors includes at least one rail wheel, rotatably attached to the connector, for moving the base along the railway. A post is attached to the base and extends outwardly from the top surface of the base to a distal end. An arm is disposed on the distal end of the post rotatably attached to the post and extends radially outwardly from the post parallel to the base to a terminal end with the arm being rotatable about the post. A support is movably attached to the arm and extends outwardly from the arm to a support end for engaging a bridge support. A trolley is slidably disposed on the arm and movable along the arm between the terminal end and the post.

SUMMARY OF THE INVENTION

The present invention provides a lifter assembly for removing or replacing highway or railway bridges that is simple in structure and lightweight. The present invention also provides for a lifter assembly that can be easily and efficiently transported to a desired location by switching between the rail wheels and traveling wheels. In addition, the present invention provides a lifter assembly that can adapt to different bridge spans having a variable width. Furthermore, the present invention provides an lifter assembly that can be easily handled making handling easier.

It is one aspect of the present invention to provide a lifter assembly for removing or replacing highway or railway bridges. The lifter assembly includes a base having a top surface for receiving a bridge span and a bottom surface disposed opposite of the top surface. A pair of connectors is attached to the base, spaced from one another, extending outwardly from the bottom surface of the base. Each of the connectors includes at least one rail wheel, rotatably attached to the connector, for moving the base along the railway. The base includes a plurality of traveling wheels, rotatably attached to the base, for transporting the base along the highway. A post is attached to the base and extends outwardly from the top surface of the base to a distal end. An arm is disposed on the distal end of the post rotatably attached to the post and extends radially outwardly from the post parallel to the base to a terminal end with the arm being rotatable about the post. A support is movably attached to the arm and extends outwardly from the arm to a support end for engaging a bridge support. A trolley is slidably disposed on the arm and movable along the arm between the terminal end and the post. Each of the traveling wheel includes a leg pivotably attached to the base and extends between the base and the traveling wheel to connect the traveling wheel to the base and move the traveling wheel between a transport position and a storage position. In the transport position, the traveling wheel and the leg is perpendicular to the connectors. In the storage position, the traveling wheel and the leg is parallel to the connectors.

It is another aspect of the present invention to provide a system for removing or replacing highway or railway bridges. The system includes a pair of lifter assemblies with each of the lifter assembly including a base having a top surface for receiving a bridge span and a bottom surface disposed opposite of the top surface. A pair of connectors is attached to the base, spaced from one another, extending outwardly from the bottom surface of the base. Each of the connectors includes at least one rail wheel rotatably attached to the connector for moving the base along the railway. The base includes a plurality of traveling wheels rotatably attached to the base for transporting the base along the highway. A post is attached to the base and extends outwardly from the top surface of the base to a distal end. An arm is disposed on the distal end of the post, rotatably attached to the post, and extends radially outwardly from the post, parallel to the base, to a terminal end with the arm being rotatable about the post. A support is movably attached to the arm and extends outwardly from the arm to a support end for engaging a bridge support. A trolley is slidably disposed on the arm and movable along the arm between the terminal end and the post. The terminal end of the arm of one of the lift assemblies is connected via a releasable connection to the terminal end of the arm of another one of the lift assemblies joining the lift assemblies to one another for moving the bridge span and allow the lift assemblies to operate as a gantry.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, it is one aspect of the present invention to provide a lifter assembly 20 for removing or replacing highway or railway bridges. The lifter assembly 20 constructed in accordance with one embodiment of the present invention is generally shown in FIG. 1.

Figure 1:
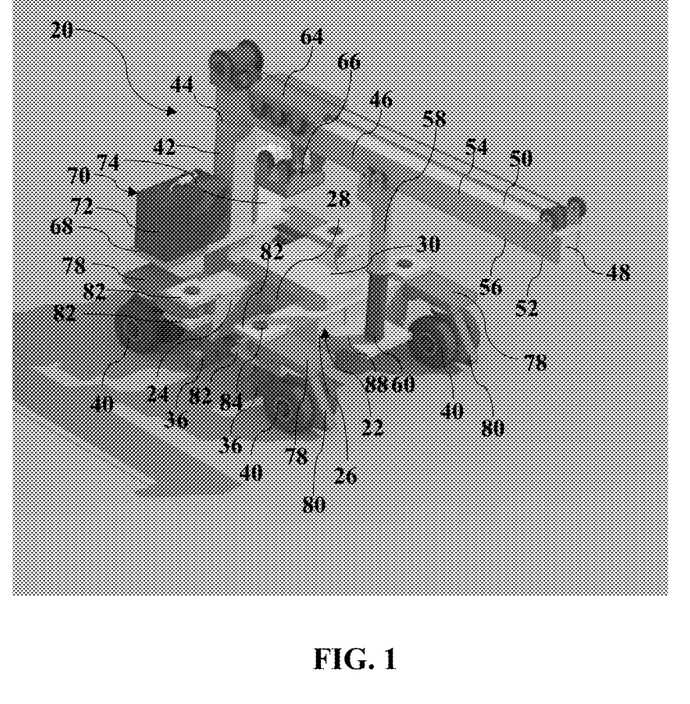
FIG. 1 a perspective view of the lifter assembly in accordance with one embodiment of the present invention.

As illustrated in FIG. 1, the lifter assembly 20 includes a base 22, having a generally H-shape. The base 22 includes a first member 24 and a second member 26 disposed parallel to and spaced from one another. An intermediate member 28 extends perpendicularly between the first member 24 and the second member 26 to connect the first member 24 with the second member 26 for receiving a bridge span 30. The base 22 has a top surface 32 for receiving the bridge span 30 and a bottom surface 34 disposed on an opposite side of the top surface 32.

Figure 2:
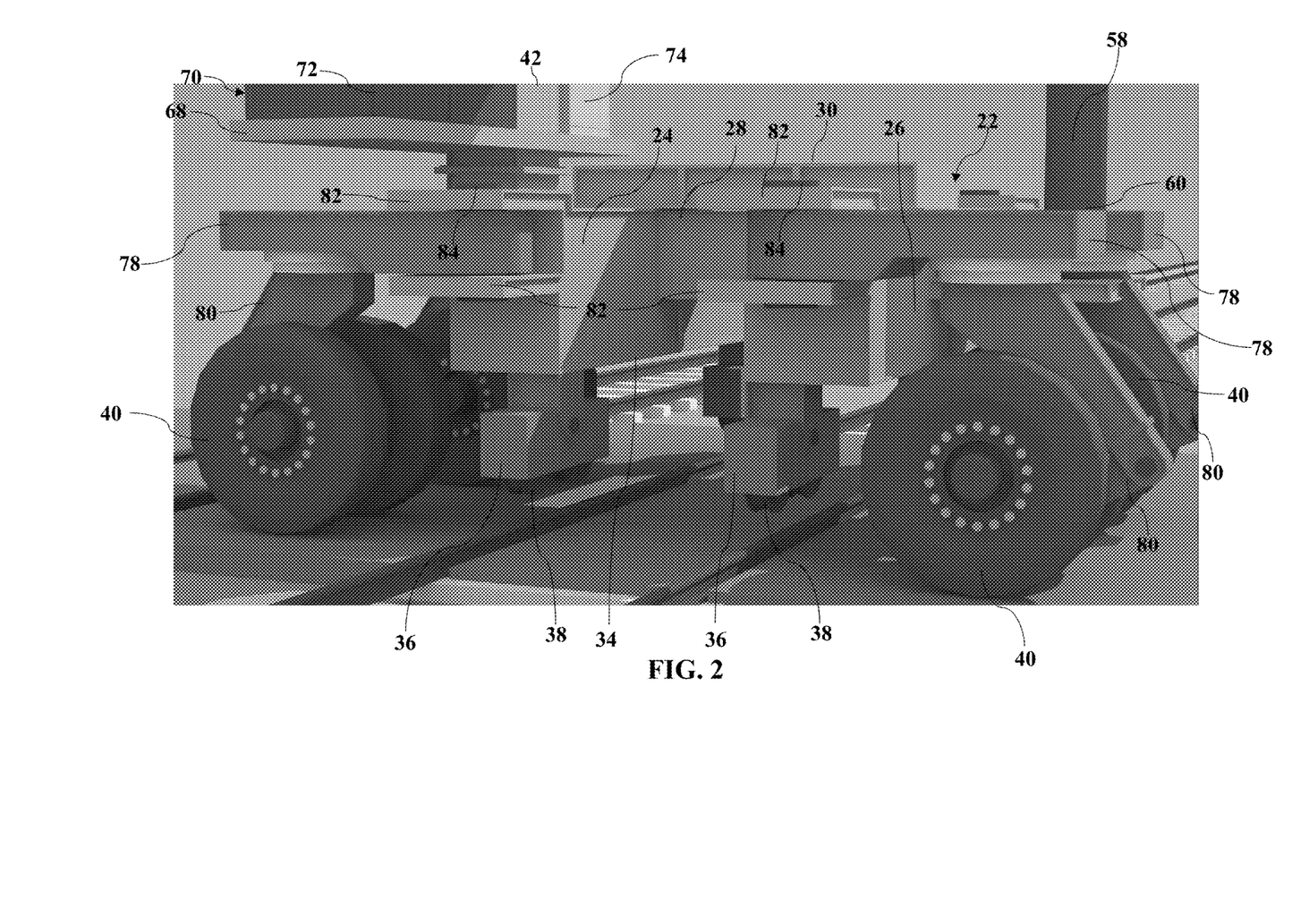
FIG. 2 is a side view of the base of the lifter assembly with the traveling wheels being in the transport position.
Figure 3:
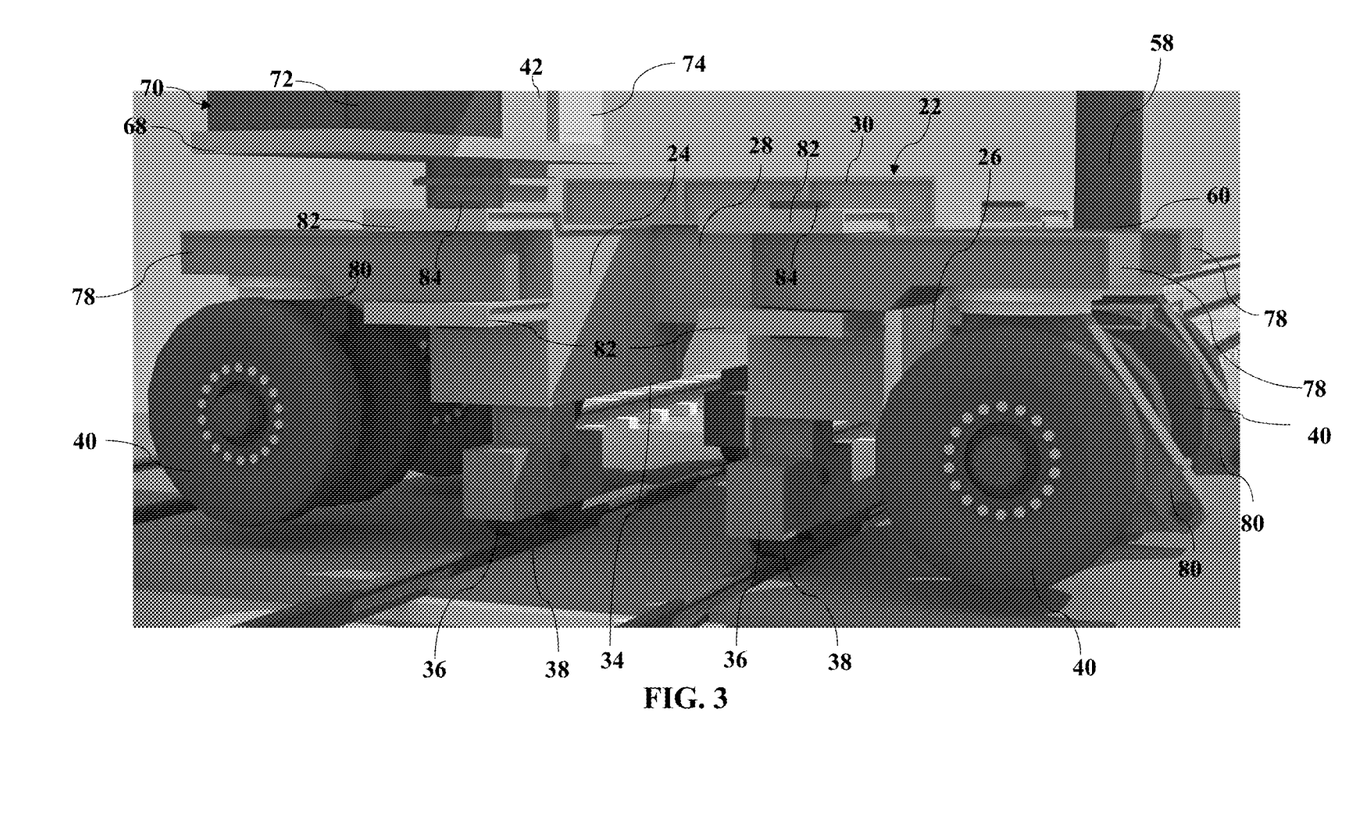
FIG. 3 is a side view of the base of the lifter assembly with the rail wheels engaging the railway.

As best shown in FIGS. 2 and 3, the first member 24 and the second member 26 each includes at least one connector 36 attached to the bottom surface 34 of the base 22 and extending perpendicularly outwardly from the bottom surface 34 of the base 22. It should appreciated that, in one embodiment of the present invention, the at least one connector 36 can include a pair of connectors 36, each having a generally T-shape, spaced from one another, attached to the base 22 and extending outwardly from the base 22. A plurality of rail wheels 38 is rotatably attached to the at least one connector 36 for engaging a railway and move the base 22 and the lifter assembly 20 along the railway. It should appreciated that, in one embodiment of the present invention, the plurality of rail wheels 38 includes a pair of rail wheels 38 rotatably attached to each one of the connectors 36 for engaging the railway.

The first member 24 and the second member 26 each includes a pair of traveling wheels 40 rotatably attached to the first member 24 and the second member 26 of the base 22 for transporting the base 22 and the lifter assembly 20 along a road or a highway. In other words, the lifter assembly 20 includes two different sets of wheels 38, 40 attached to the base—a set of rail wheels 38 and a set of traveling wheels 40. By having two different set of wheels 38, 40, it allows the lifter assembly 20 to be easily transported to a desired location, e.g. moving either along the road (or highway) or along the railway for removing or replacing highway or railway bridges.

Figure 4:
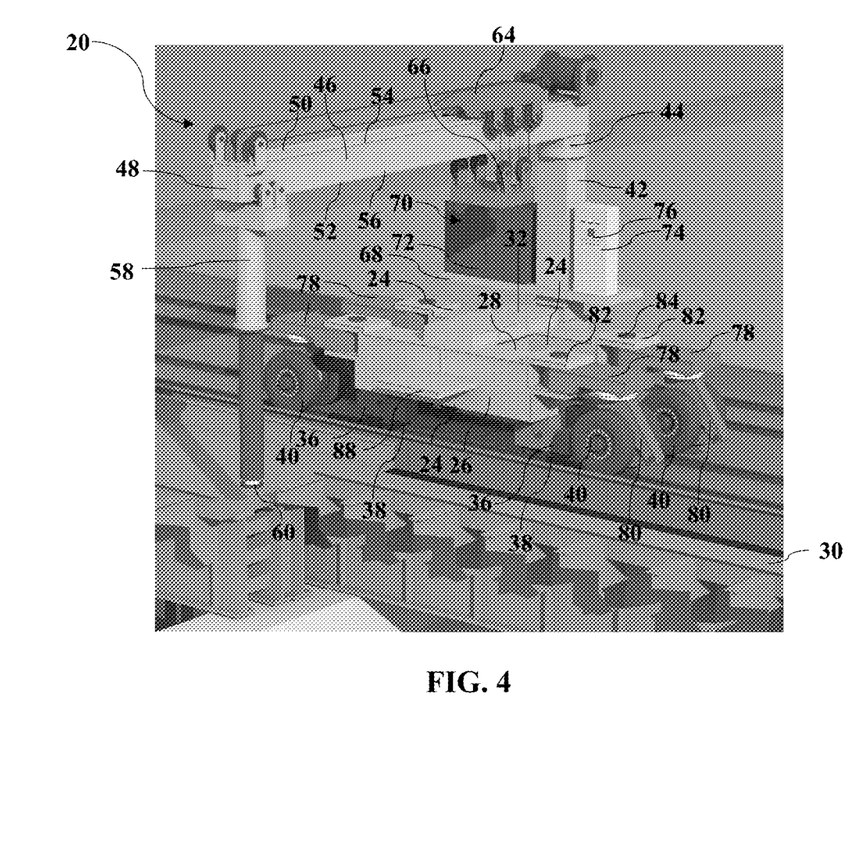
FIG. 4 is a perspective view of the lifter assembly with the traveling wheels in the storage position and the support being in the retracted position.
Figure 5:
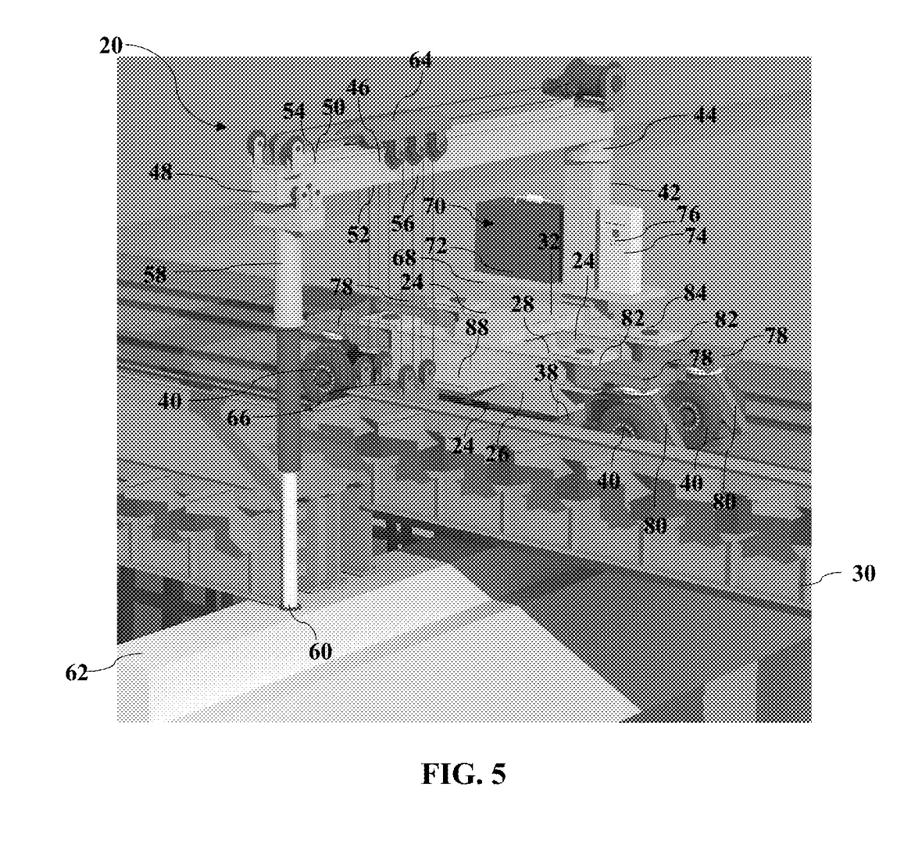
FIG. 5 is a perspective view of the lifter assembly with the traveling wheels in the storage position and the support being in the extended position.
Figure 6:
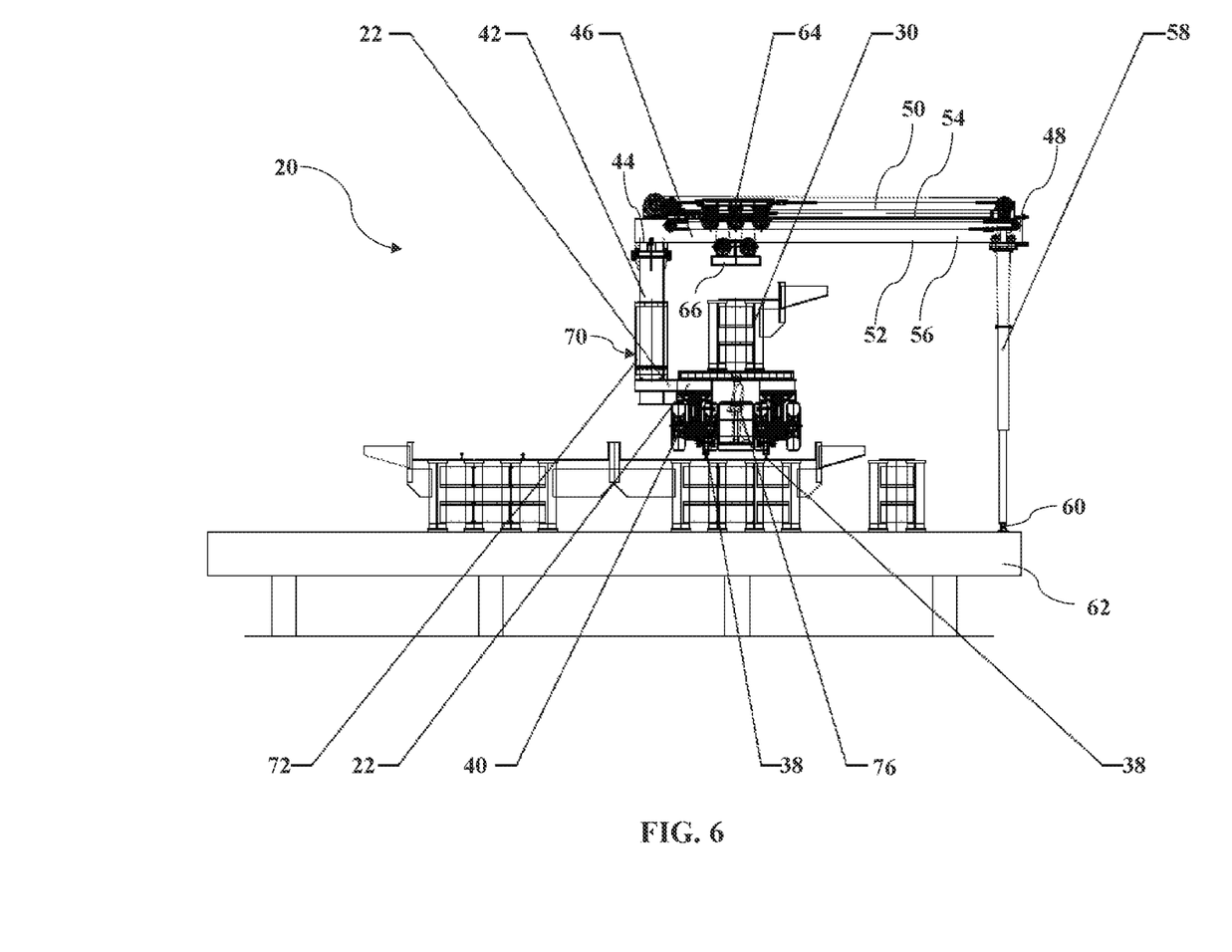
FIG. 6 is a front view of the lifter assembly shown in FIG. 5.

As best shown in FIGS. 4 through 6, a post 42 is attached to the first member 24 of the base 22 and extends perpendicularly outwardly from the top surface 32 of the base 22 to a distal end 44. An arm 46, having a generally rectangular shape, is disposed on the distal end 44 of the post 42. The arm 46 is rotatably attached to the post 42 and extends radially outwardly from the post 42, parallel to the base 22 to a terminal end 48 spaced from the post. In other words, the arm 46 is rotatably attached to the distal end 44 of the post 42 and is able to freely rotate about the post 42. In one embodiment of the present invention, the arm 46 has a top 50 and a bottom 52 and includes a pair of top rails 54 and a pair of bottom rails 56. The top rails 54 are disposed at the top 50 and extends perpendicularly outwardly from the arm 46 and away from one another. The bottom rails 56 are disposed at the bottom 52, spaced from the top rails 54, and extends outwardly from the arm 46 away from one another. It should be appreciated that the arm 46 can be telescopic and longitudinally extendable to a length that exceeds a width of the railway bridge to be replace or removed.

A support 58 is attached to the bottom rails 56 of the arm 46 and extends outwardly from the arm 46 to a support end 58 for engaging a bridge support 62. A trolley 64 is slidably disposed on the top rails 54 of the arm 46 and movable along the arm 46 between the terminal end 48 of the arm 46 and the post 42. The trolley 64 includes a winch 66 attached to the trolley 64 for movement with the trolley 64. The winch 66 can be raise and lowered for engaging the bridge span 30. A platform 68, having a generally rectangular shape, is attached to the post 42 spaced from the base 22 and extends radially outward from the post 42. An actuator 70 is disposed on the platform 68 and is connected to the trolley 64 and the winch 66 for moving the trolley 64 and the winch 66 longitudinally along the arm 46 and raising/lowering the winch 66 to engage the bridge span 30. The actuator 70 includes a generator 72 disposed on the platform 68, adjacent to the post 42, for supplying power. The actuator 70 also includes an engine 74 disposed on the platform 68, adjacent to the post 42 and electrically connected to the generator 72, for receiving power from the generator 72. The engine 74 is also connected to the trolley 64 and the winch 66. The actuator 70 further includes a controller 76 electrically connected to the engine 74 and the generator 72 for controlling the engine 74 and the generator 72. It should be appreciated that the controller 76 can be disposed on the platform 68, or directly attached to the generator 72 or the engine 74. In addition, the controller 76 can be disposed between the first member 24 and the second member 24 and attached to the base 22.

As best illustrated in FIGS. 2-4, each of the traveling wheel 40 includes a leg 78 pivotably attached to the base 22 extending between the base 22 and the traveling wheel 40 to connect the traveling wheel 40 to the base 22 and move the traveling wheel 40 between a transport position and a storage position. In the transport position, the traveling wheel 40 and the leg 78 are perpendicular to the connectors 36, the first member 24, and the second member 26. In the storage position, the traveling wheel 40 and the leg 78 are parallel to the first member 24, the second member 26, and the connectors 36. The leg 78 includes an extension member 80 extending outwardly from the leg 78, parallel to the connectors 36 and rotatably attached to the traveling wheel 40. The extension member 80 is extendable in a direction perpendicular to the leg 78 for raising and lowering the traveling wheels 40 to adjust the height of the base 22. The first member 24 and the second member 26 each includes a pair of fins 82, spaced from one another, extending outwardly from the base 22 to receive the leg 78 between the fins 82. A fastener 84 extends through the fins 82 to secure the leg 78 to the fins 82 of the base 22 and allow the leg 78 to pivot between the transport position and the storage position.

In one embodiment of the present invention, as shown in FIGS. 4 and 5, the support 58 is slidably attached to the arm 46 and movable along the arm 46 between the post 42 and the terminal end 48 of the arm 46. The support 58 is telescopic and movable between an extended position and retracted position. In the extended position, as best shown in FIGS. 5 and 6, the support 58 extends perpendicularly outwardly from the arm 46 with the support end 60 extending beyond the traveling wheels 40 and the rail wheels 38 for engaging a bridge support 62. In the retracted position, as best shown in FIGS. 2-4, the support 58 extends outwardly from the arm 46 with the support end 60 being disposed adjacent to the base 22. The base 22 further includes a plate 88 extending outwardly from the second member 26 of the base 22 to receive the support end 60 in the retracted position.

In an alternative embodiment of the present invention, the support 58 is pivotably attached to the terminal end 48 of the arm 46 and movable about the terminal end 48 of the arm 46 between an extended position and a retracted position. In the extended position, the support 58 extends perpendicularly outwardly from the arm 46 with the support end 60 being beyond the traveling wheels 40 and the rail wheels 38 for engaging the bridge support 62. In the retracted position, the support 58 extends outwardly from the arm 46 with the support end 60 being disposed adjacent to the base 22 and at an oblique angle relative to the arm 46. Alternatively, in the retracted position, the support 58 can be folded in parallel relationship to the arm 46.

Figure 7:
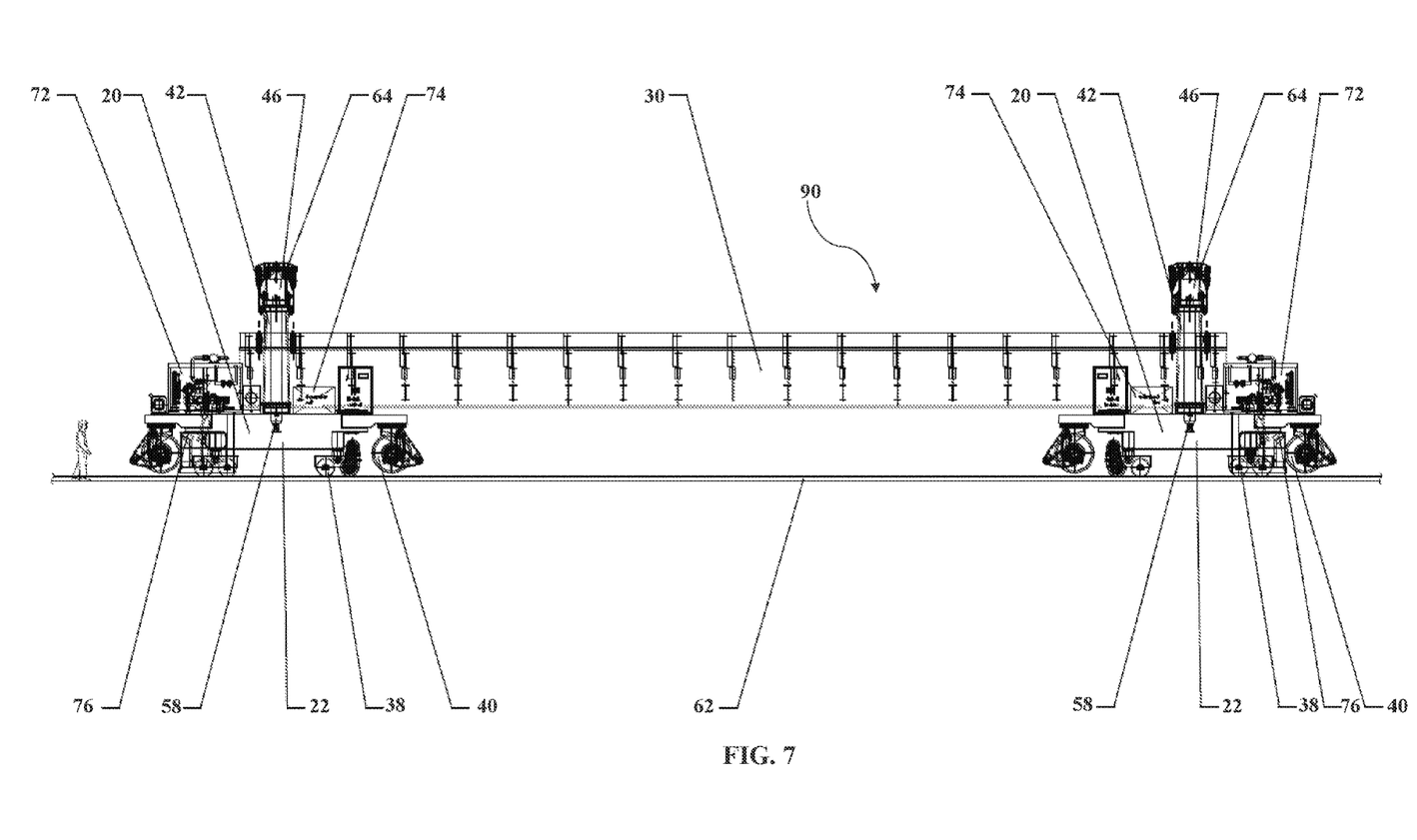
FIG. 7 is a side view of a pair of lifter assemblies transporting a bridge span.
Figure 8:
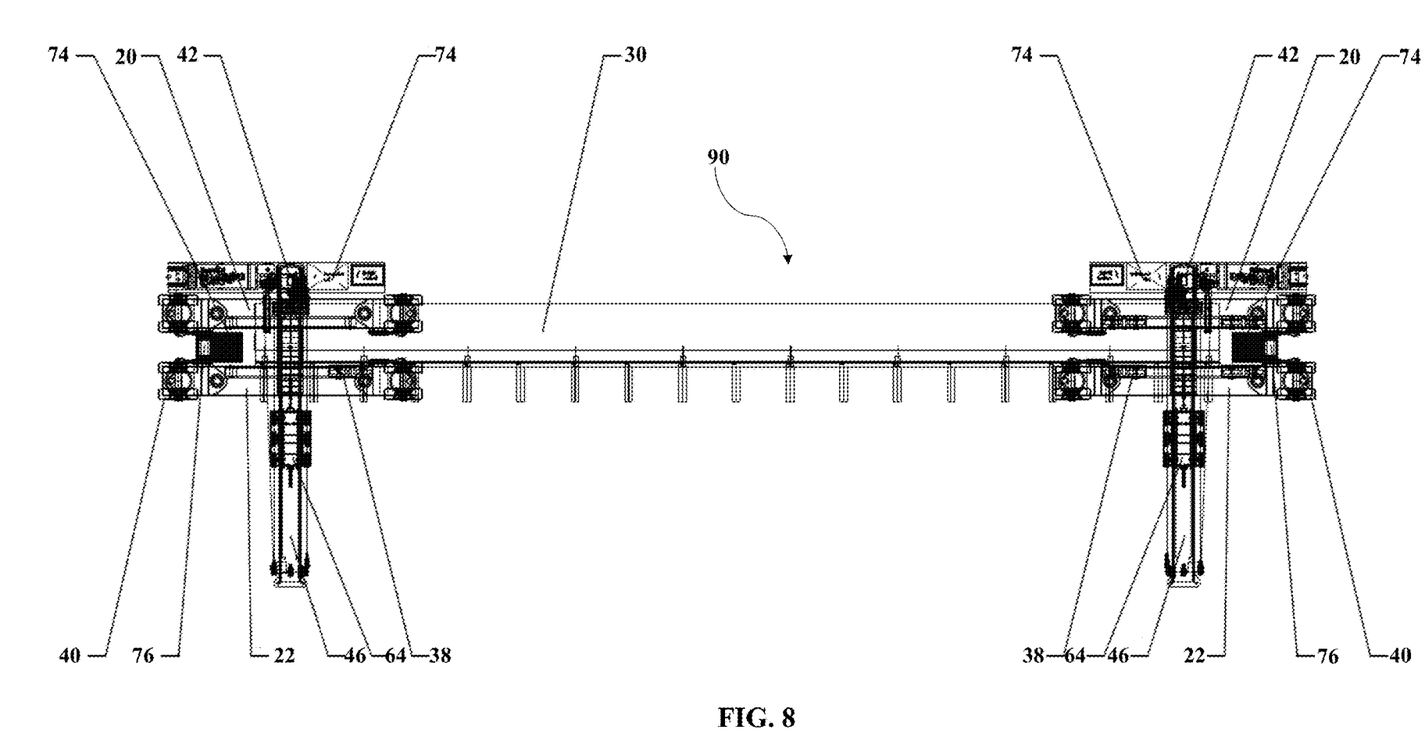
FIG. 8 is a top view of the pair of lifter assembles shown in FIG. 7.
Figure 9:
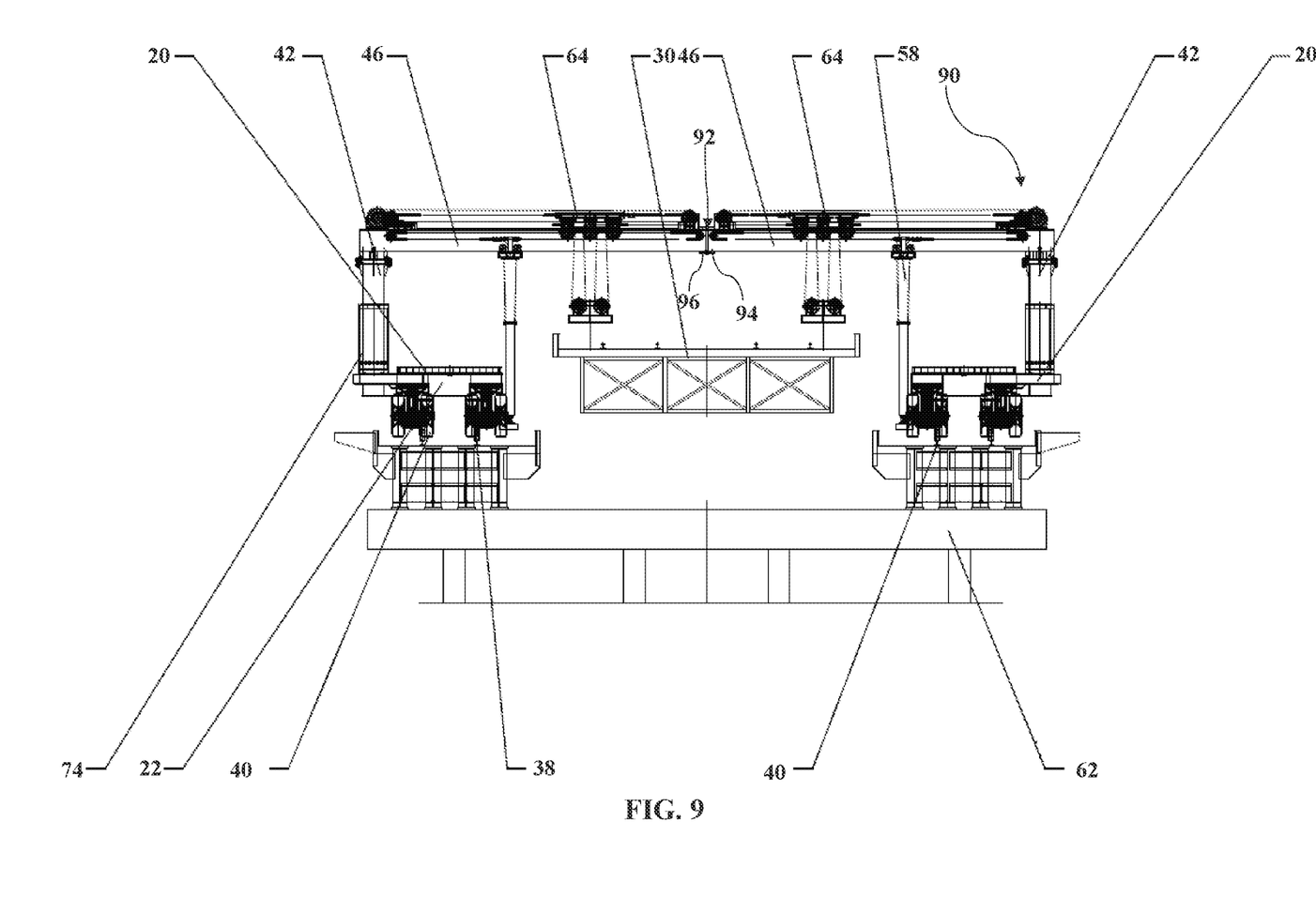
FIG. 9 is a front view of a system for removing highway or railway bridges constructed in one embodiment of the present invention.

As best shown in FIGS. 7-10, it is another aspect of the present invention to provide a system 90 for removing or replacing highway or railway bridges. The system 90 includes a plurality of lifter assemblies 20. As illustrated in FIGS. 6 and 7, in one embodiment of the present invention, the system 90 includes a pair of lifter assemblies 20. The lifter assembles 20 can be disposed in tandem relative to one another with the bridge span 30 being disposed on the base 22 of the lifter assemblies 20 for transporting the bridge span 30 along the railway. In the event that the bridge span 30 is too wide or too heavy for a single lifter assembly 20 to carry. The lifter assemblies 20 can be connected to one another to operate as a gantry for lifting the bridge span 30. In particular, the terminal end 48 of the arm 46 of one of the lift assemblies 20 can be connected, via a releasable connection 92, to the terminal end 48 of the arm 46 of another one of the lift assemblies 20. In other words, the releasable connection 92 joins the lift assemblies 20 to one another for moving the bridge span 30 and allow the lift assemblies 20 to operate as a gantry for lifting and transporting the heavy bridge span 30.

In one embodiment of the present invention, the releasable connection 92 can be defined as a collar 94 and bolts 96 type of engagement. The collar 94 extends about the terminal end 48 of the arm 46 of the lift assembles 20 and a plurality of bolts 96, extending through the collar 94 and spaced from one another, to secure the collar 94 to arms 46 of the lift assemblies 20 to connect the lift assemblies 20 to one another. Alternatively, in another embodiment of the present invention, the releasable connection 92 can be defined as a protrusion-slot type of engagement. For example, the terminal end 48 of the arm 46 of one of the lift assemblies 20 can define a plurality of slots spaced from one another. The terminal end 48 of the arm 46 of another one of the lift assemblies 20 can define a plurality of protrusions extending outwardly from the arm 46 and received by the slots to connect the lift assemblies 20 to one another.

Figure 10:
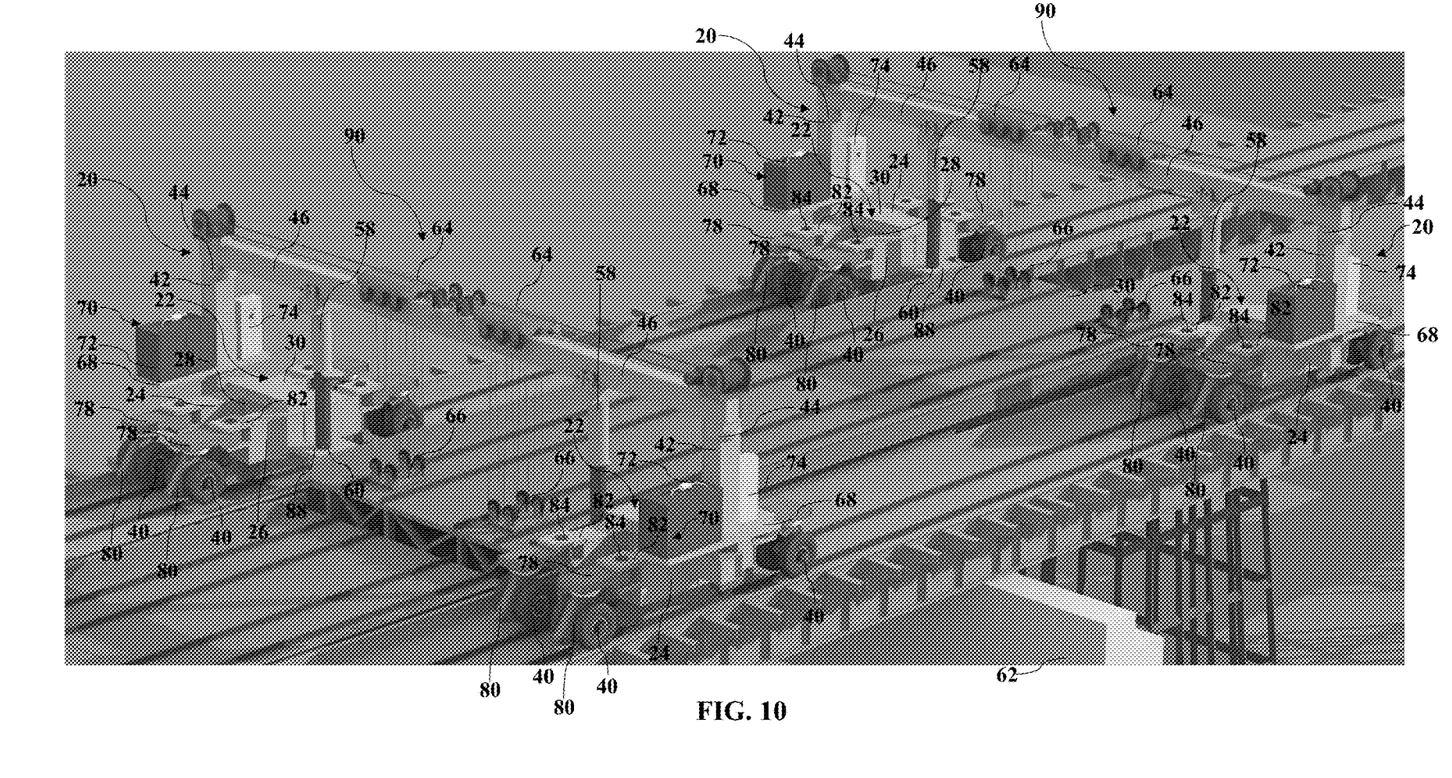
FIG. 10 is a perspective view of the system for removing highway or railway bridges.

As shown in FIG. 10, in the event that the bridge span 30 is too wide or too heavy for the pair of lifter assemblies 20, two pairs of the lifter assembles 20 can be used to move the bridge span 30. In this arrangement, the first pair of the lifter assemblies 20 are connected to one another via the releasable connection 92 and the second pair of the lifter assemblies 20 are also connected to one another via the releasable connection. The first pair and the second pair of the lifter assemblies, spaced from one another, work together to lift and transport the bridge span 30.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A lifter assembly for removing or replacing highway or railway bridges comprising:
    a base having a top surface for receiving a bridge span and a bottom surface disposed opposite of said top surface;
    a pair of connectors attached to said base spaced from one another and extending outwardly from said bottom surface of said base;
    each of said connectors including at least one rail wheel rotatably attached to said connector for moving said base along the railway;
    said base including a plurality of traveling wheels rotatably attached to said base for transporting said base along the highway;
    a post attached to said base and extending outwardly from said top surface of said base to a distal end;
    an arm disposed on said distal end of said post rotatably attached to said post and extending radially outwardly from said post parallel to said base to a terminal end with said arm being rotatable about said post;
    a support movably attached to said arm and extending outwardly from said arm to a support end for engaging a bridge support;
    a trolley slidably disposed on said arm and movable along said arm between said terminal end and said post; and
    each of said traveling wheel including a leg pivotably attached to said base and extending between said base and said traveling wheel to connect said traveling wheel to said base and move said traveling wheel between a transport position and a storage position with said transport position being defined as said traveling wheel and said leg being perpendicular to said connectors and said storage position being defined as said traveling wheel and said leg being parallel to said connectors.

2. The lifter assembly as set forth in claim 1 wherein said leg includes an extension member extending outwardly from said leg parallel to said base and attached to said traveling wheel with said extension member being extendable for raising and lowering the traveling wheels to raise and lower said base.

3. The lifter assembly as set forth in claim 2 wherein said base including a pair of fins spaced from one another and extending outwardly from said base to receive said leg between said fins.

4. The lifter assembly as set forth in claim 3 further including a fastener extending through said fins to secure said leg to said fins of said base and allow said leg to pivot about said base between said transport position and said storage position.

5. The lifter assembly as set forth in claim 1 wherein said support is slidably attached to said arm and movable along said arm between said post and said terminal end of said arm.

6. The lifter assembly as set forth in claim 5 wherein said support is telescopic and movable between an extended position and retracted position with said extended position being defined as said support extending perpendicularly outwardly from said arm with said support end being beyond said traveling wheels and said rail wheels to engage a bridge support and said retracted position being defined as said support extending outwardly from said arm with said support end being disposed adjacent to said base.

7. The lifter assembly as set forth in claim 6 further including a plate extending outwardly from said base to receive said support end in said retracted position.

8. The lifter assembly as set forth in claim 1 wherein said support is pivotably attached to said terminal end of said arm.

9. The lifter assembly as set forth in claim 8 wherein said support is movable about said arm between an extended position and a retracted position with said extended position being defined as said support extending perpendicularly outwardly from said arm with said support end being beyond said traveling wheels and said rail wheels for engaging the bridge support and said retracted position being defined as said support extending outwardly from said arm with said support being disposed at an oblique angle relative to said arm.

10. The lifter assembly as set forth in claim 1 wherein said arm has a top and a bottom and including a pair of top rail and a pair of bottom rail with said pair of top rails being disposed at said top and extending perpendicularly outwardly from said arm and away from one another and said bottom rails being disposed at said bottom spaced from said top rail and extending outwardly from said arm and away from one another.

11. The lifter assembly as set forth in claim 10 wherein said trolley is slidably attached to said top rail and said support is slidably attached to said bottom rail.

12. The lifter assembly as set forth in claim 1 wherein said arm is telescopic and longitudinally extendable to a length exceeding a width of a railway bridge to be replace or removed.

13. A system for removing or replacing highway or railway bridges comprising:
a pair of lifter assemblies with each of said lifter assembly including a base having a top surface for receiving a bridge span and a bottom surface disposed opposite of said top surface;
a pair of connectors attached to said base spaced from one another and extending outwardly from said bottom surface of said base;
each of said connectors including at least one rail wheel rotatably attached to said connector for moving said base along a railway;
said base including a plurality of traveling wheels rotatably attached to said base for transporting said base along the highway;
a post attached to said base and extending outwardly from said top surface of said base to a distal end;
an arm disposed on said distal end of said post rotatably attached to said post and extending radially outwardly from said post parallel to said base to a terminal end with said arm being rotatable about said post;
a support movably attached to said arm and extending outwardly from said arm to a support end for engaging a bridge support;
a trolley slidably disposed on said arm and movable along said arm between said terminal end and said post; and
said terminal end of said arm of one of said lift assemblies being connected via a releasable connection to said terminal end of said arm of another one of said lift assemblies joining said lift assemblies to one another for moving the bridge span and allow the lift assemblies to operate as a gantry.

14. The system as set forth in claim 13 further including a collar extending about said distal ends of said lift assemblies and a plurality of bolts extending through said collar and said arms to define said releasable connection and connecting said lift assemblies to one another.

15. The system as set forth in claim 13 wherein said terminal end of said arm of said one of said lift assemblies defining a plurality of slots spaced from one another and said terminal end of said arm of said another one of said lift assemblies defining a plurality of protrusions received by said slots to define said releasable connection and connecting said lift assemblies to one another.

16. A lifter assembly for removing or replacing highway or railway bridges:
a base of generally H-shape having a first member and a second member disposed parallel and spaced to one another and an intermediate member extending perpendicularly between said first member and said second member to connect said first member and said second member for receiving a bridge span;
said base having a top surface for receiving the bridge span and a bottom surface disposed opposite of said top surface;
said first member and said second member each including at least one connector attached to said base and extending outwardly from said bottom surface of said base;
a plurality of rail wheels rotatably attached to said at least one connector for moving engaging a railway and move said base along said railway;
said at least one connector including a pair of connectors each having a generally T-shape spaced from one another and attached to said base and extending outwardly from said base;
said plurality of rail wheels including a pair of rail wheels rotatably attached to said at least one connector for engaging the railway;
said first member and said second member each including a pair of traveling wheels rotatably attached to said first member and said second member of said base for transporting said base along the highway;
a post attached said first member of said base and extending outwardly from said top surface of said base in a perpendicular relationship with said top surface of said base to a distal end;
an arm having disposed on said distal end of said post rotatably attached to said post and extending radially outwardly from said post parallel to said base to a terminal end spaced from said post with said arm being rotatable about said post;

said arm having a top and a bottom and including a pair of top rails and a pair of bottom rails with said pair of top rails being disposed at said top and extending perpendicularly outwardly from said arm and away from one another and said pair of bottom rails being disposed at said bottom spaced from said pair of top rails and extending outwardly from said arm and away from one another;

said arm being telescopic and longitudinally extendable to a length exceeding a width of the railway bridge to be replace or removed;

a support attached to said pair of bottom rails of said arm and extending outwardly from said arm to a support end for engaging a bridge support;

a trolley slidably disposed on said pair of top rails of said arm and movable along said arm between said terminal end and said post;

said trolley including a winch attached to said trolley for movement with said trolley to engage the bridge span;

a platform of generally rectangular shape attached to said post spaced from said base and extending radially outward from said post;

an actuator disposed on said platform and connected to said trolley and said winch for moving said trolley along said arm and said winch to engage a bridge span;

said actuator including a generator disposed on said platform for supplying power to the actuator;

said actuator including an engine disposed on said platform electrically connected to said generator for receiving power from said generator and connected to said trolley and said winch;

said actuator including a controller disposed on said platform and electrically connected to said engine and said generator for controlling said engine and said generator; and each of said traveling wheels including a leg pivotably attached to said base and extending between said base and said traveling wheel to connect said traveling wheel to said base and move said traveling wheel between a transport position and a storage position with said transport position being defined as said traveling wheel and said leg being perpendicular to said first member and said second member and said storage position being defined as said traveling wheel and said leg being parallel to said first member;

said leg including an extension member extending outwardly from said leg parallel to said connectors and rotatably attached to said traveling wheel with said extension member being extendable in a direction perpendicular to said leg for raising and lowering the pair of traveling wheels to adjust a height of said base;

said first member and said second member each including a pair of fins spaced from one another and extending outwardly from said base to receive said leg between said pair of fins;

a fastener extending through said pair of fins to secure said leg to said pair of fins of said base and allow said leg to pivot between said transport position and said storage position.

17. The lifter assembly as set forth in claim 16 wherein said support is slidably attached to said arm and movable along said arm between said post and said terminal end of said arm.

18. The lifter assembly as set forth in claim 17 wherein said support is telescopic and movable between an extended position and retracted position with said extended position being defined as said support extending perpendicularly outwardly from said arm with said support end being beyond said traveling wheels and said rail wheels for engaging the bridge support and said retracted position being defined as said support extending outwardly from said arm with said support end being disposed adjacent to said base.

19. The lifter assembly as set forth in claim 16 further including a plate extending outwardly from said second member of said base to receive said support end in said retracted position.

20. The lifter assembly as set forth in claim 16 wherein said support is pivotably attached to said terminal end of said arm.

* * * * *